United States Patent
Xie et al.

(10) Patent No.: US 12,308,715 B2
(45) Date of Patent: May 20, 2025

(54) MAGNET-ASSISTED WOUND ROTOR FOR ELECTRIC MOTOR

(71) Applicant: Rivian IP Holdings, LLC, Irvine, CA (US)

(72) Inventors: Yanyan Xie, Ranchos Palos Verdes, CA (US); Khwaja Rahman, Troy, MI (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 18/339,970

(22) Filed: Jun. 22, 2023

(65) Prior Publication Data

US 2024/0429801 A1    Dec. 26, 2024

(51) Int. Cl.
  *H02K 1/27*    (2022.01)
  *H02K 1/276*   (2022.01)
  *H02K 21/04*   (2006.01)

(52) U.S. Cl.
  CPC ........... *H02K 21/042* (2013.01); *H02K 1/276* (2013.01)

(58) Field of Classification Search
  CPC .............................. H02K 21/042; H02K 1/276
  See application file for complete search history.

(56) References Cited

U.S. PATENT DOCUMENTS

| | | | | |
|---|---|---|---|---|
| 9,356,498 | B2 * | 5/2016 | Mipo | H02K 23/02 |
| 2007/0090713 | A1 * | 4/2007 | Arita | H02K 21/042 |
| | | | | 310/191 |
| 2008/0129129 | A1 * | 6/2008 | Kori | H02K 1/2766 |
| | | | | 310/58 |
| 2009/0184598 | A1 * | 7/2009 | Nakano | H02K 1/2781 |
| | | | | 318/400.32 |
| 2010/0207480 | A1 * | 8/2010 | Reutlinger | H02K 21/042 |
| | | | | 310/181 |
| 2010/0231181 | A1 * | 9/2010 | Xu | H02K 19/38 |
| | | | | 290/1 R |
| 2012/0248921 | A1 * | 10/2012 | Mipo | H02K 23/02 |
| | | | | 310/181 |
| 2016/0105064 | A1 * | 4/2016 | Huh | H02K 29/12 |
| | | | | 310/156.01 |
| 2022/0069649 | A1 * | 3/2022 | Mongeau | F03D 9/25 |

OTHER PUBLICATIONS

Chai et al., "Analysis and Design of a PM-Assisted Wound Rotor Synchronous Machine with Reluctance Torque Enhancement," IEEE Transactions on Industrial Electronics, vol. 68, No. 4, Apr. 2021, pp. 2887-2897.

Du et al., "Optimal Design of an Inset PM Motor with Assisted Barriers and Magnet Shifting for Improvement of Torque Characteristics," IEEE Transactions on Magnetics, vol. 53, No. 11, Nov. 2017.

(Continued)

*Primary Examiner* — Thomas Truong
(74) *Attorney, Agent, or Firm* — BAKERHOSTETLER

(57) ABSTRACT

Aspects of the subject disclosure relate to an electric motor that includes a rotor with both permanent magnets and operable coils. The coils of the rotor can be operated to generate a temporary magnetic field that supplements the permanent magnetic field of the permanent magnets. Accordingly, the amount of torque output by the rotor can be controlled by operating the coils of the rotor as needed.

18 Claims, 10 Drawing Sheets

(56) References Cited

OTHER PUBLICATIONS

Fukami et al., "Steady-State Analysis of a Permanent-Magnet-Assisted Salient-Pole Synchronous Generator," IEEE Transactions on Energy Conversion, vol. 25, No. 2, Jun. 2010, pp. 388-393.
Hosoi et al., "Magnetic Circuit Analysis of Permanent-Magnet-Assisted Salient-Pole Synchronous Machines Under Steady States," IEEE Transactions on Industry Applications, vol. 48, No. 3, May/Jun. 2012, pp. 895-902.
Hwang et al., "Torque Improvement of Wound Field Synchronous Motor for Electric Vehicle by PM-assist," IEEE Transactions on Industry Applications, vol. 54, No. 4, Jul./Aug. 2018, pp. 3252-3259.
Juergens et al., "Innovative Design of an Air Cooled Ferrite Permanent Magnet Assisted Synchronous Reluctance Machine for Automotive Traction Application," XXII International Conference on Electrical Machines (ICEM), Sep. 2016, pp. 803-810.
Yamazaki et al., "Estimation of Assist Effects by Additional Permanent Magnets in Salient-Pole Synchronous Generators," IEEE Transactions on Industrial Electronics, vol. 59, No. 6, Jun. 2012, pp. 2515-2523.
Yamazaki et al., "Rotor Shape Optimization for Output Maximization of Permanent Magnet Assisted Synchronous Machines," IEEE Transactions on Industry Applications, vol. 51, No. 4, Jul./Aug. 2015, pp. 2374-2381.
Zhao et al., "Design and Analysis of a Novel PM-Assisted Synchronous Reluctance Machine with Axially Integrated Magnets by Finite Element Method," IEEE Transactions on Magnetics, vol. 53, No. 6, Jun. 2017.

\* cited by examiner

MAGNET-ASSISTED WOUND ROTOR FOR ELECTRIC MOTOR

INTRODUCTION

The present disclosure relates generally to the automotive, manufacturing, and industrial equipment fields. More particularly, the present disclosure relates to an electric motor with a magnet-assisted wound rotor.

SUMMARY

The present description relates generally to an electric motor that includes a rotor with both permanent magnets and operable coils. The coils of the rotor can be operated to generate a temporary magnetic field that supplements the magnetic field of the permanent magnets. Accordingly, the amount of torque output by the rotor can be controlled by operating the coils of both the stator and the rotor as needed.

In accordance with one or more aspects of the disclosure, a rotor for an electric motor includes a body configured to rotate about a central axis; permanent magnets within the body and circumferentially spaced apart from each other about the central axis; and rotor coils within the body, wherein each of the rotor coils forms winding segments that are positioned circumferentially between a corresponding adjacent pair of the permanent magnets.

In accordance with one or more aspects of the disclosure, a motor includes a stator comprising stator coils configured to generate a rotating magnetic field; and a rotor configured to rotate about a central axis and comprising: permanent magnets circumferentially spaced apart from each other about the central axis, wherein circumferentially adjacent ones of the permanent magnets generate different permanent magnetic fields with respect to the central axis; and rotor coils forming winding segments, wherein each group of the winding segments that is circumferentially between a corresponding adjacent pair of the permanent magnets is configured to receive a current and generate a temporary magnetic field that supplements the different permanent magnetic fields of the corresponding adjacent pair of the permanent magnets.

In accordance with one or more aspects of the disclosure, a method includes operating stator coils of a stator to generate a rotating magnetic field that extends through a rotor comprising permanent magnets and rotor coils, wherein the permanent magnets of the rotor generate permanent magnetic fields; determining a demand for torque; and if the demand for torque is above a threshold, operating the rotor coils of the rotor to generate temporary magnetic fields that supplement the permanent magnetic fields of the permanent magnets.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

The present description relates generally to an electric motor that includes a rotor with both permanent magnets and operable coils. The coils of the rotor can be operated to generate a temporary magnetic field that supplements the permanent magnetic field of the permanent magnets. Accordingly, the amount of torque output by the rotor can be controlled by operating the coils of both the stator and the rotor as needed.

Permanent magnets, such as heavy rare earth (HRE) magnets, can be costly, particularly in response to demand and supply issues. As the supply of such permanent magnets is restricted and demand increases, the cost can likewise increase over time. Accordingly, it can be beneficial to provide a machine with capabilities that reduce the reliance on permanent magnets. Furthermore, by providing wound rotor windings with the rotor of an electric motor, performance can be controlled to meet output demands despite a reduction in permanent magnets.

Accordingly, electric motors, such as those described herein, can provide high performance characteristics while using fewer and/or smaller magnets. Such an electric motor can also have flexible and adaptive control parameters that allow it to tune the operating conditions to match the requirements. In particular, when the demand for torque is lower, the stator and/or rotor excitations can be controlled to maximize the efficiency of the electric motor.

In certain embodiments, the motor described herein can include features of a synchronous electric motor. However, it will be understood that one or more features of the present disclosure can apply to one of a variety of motor types, including synchronous electric motors, permanent magnet synchronous electric motors (PMSMs), line start synchronous motors (LSSMs), line start permanent magnet motors (LSPMMs), and the like.

Figure 1:
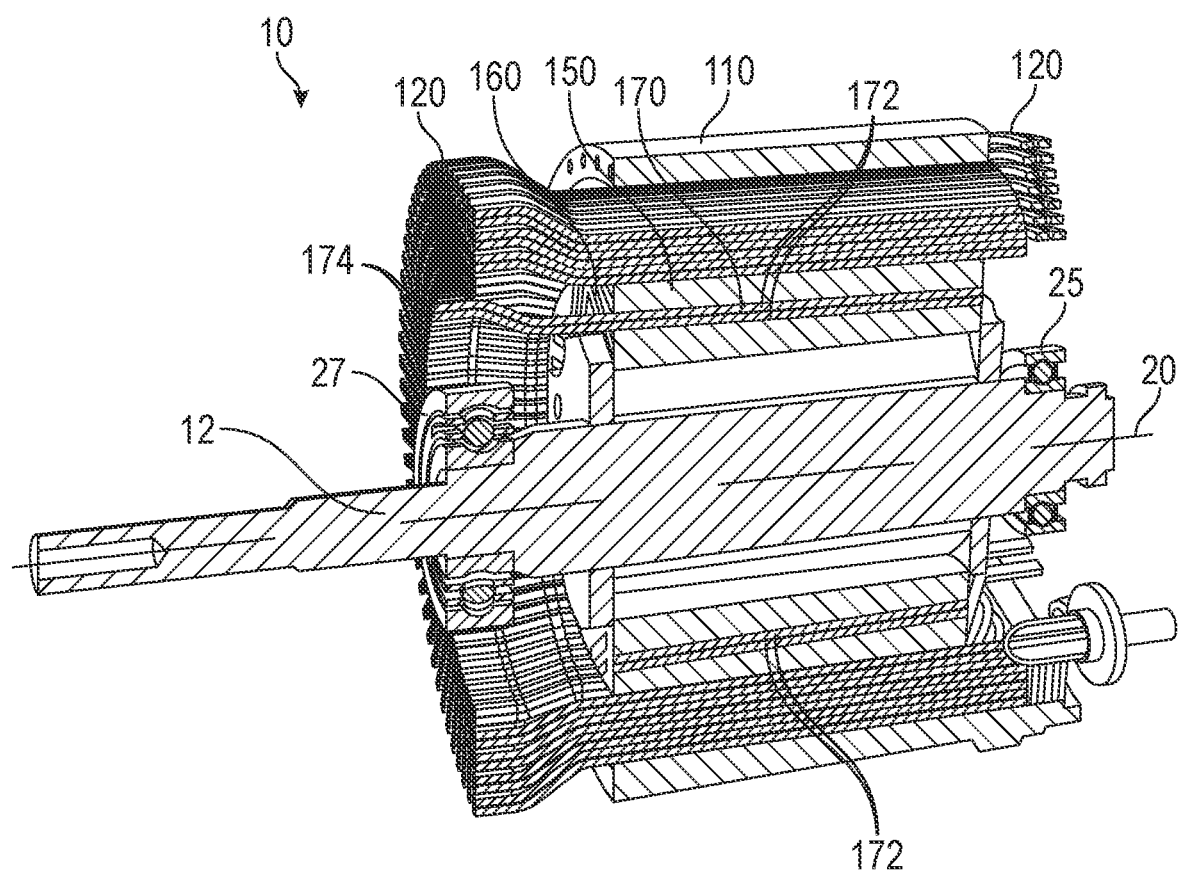
FIG. 1 illustrates a perspective sectional view of an example electric motor in accordance with one or more implementations of the subject technology.

Referring to FIG. 1, a motor can include a stator and a rotor for providing rotational output at a shaft. FIG. 1 is a partial perspective view of a motor 10 having a stator 110 and a rotor 150.

In some embodiments, as shown in FIG. 1, a motor 10 can include a generally cylindrical rotor shaft 12 concentrically surrounded by a cylindrical rotor 150. As used herein, "cylindrical" and "annular" refer to structures having a generally circular internal cross-sectional shape, and a likely a roughly circular external cross-sectional shape, although this external cross-sectional shape may vary to some degree, having flat or irregular regions. The rotor shaft 12 and rotor 150 are configured to rotate concentrically about a common central axis 20 in unison, potentially at high revolutions-per-minute (RPM). The rotor 150 can be manufactured from electric steel. The rotor shaft 12 can be manufactured from steel and/or other possible metal or metal alloy.

The motor 10 can include a stator 110 comprising stator coils 120 configured to generate a rotating magnetic field. The rotating magnetic field can be generated by running multiple-phase currents through the stator coils 120. The stator coils 120 can form segments of its windings distributed about the rotor 150. For example, as shown in FIG. 1, the stator coils 120 can form segments that each extend in a direction that is generally parallel to the central axis 20 of the rotor 150. The rotating magnetic field generated by the stator 110 can rotate about the central axis 20 of the rotor 150. Neither the stator 110 nor the stator coils 120 need to move to generate the rotating magnetic field. For example, the coils can be operated with an alternating current with different segments thereof having a different direction and/or magnitude of current at any given moment. As the current direction and/or magnitude changes for each segment of the stator coils 120 over time, the magnetic field generated in the vicinity thereof can correspondingly change. Accordingly, the resulting magnetic field can be characterized as a standing magnetic field (e.g., with alternating magnetic field directions extending circumferentially about the central axis 20) that rotates about the central axis 20. The rotating magnetic field can further extend through the rotor 150, which can include permanent magnets 160 and rotor coils 170. The rotating magnetic field generated by the stator 110 can magnetically interact with such components of the rotor 150 to cause the rotor 150 to rotate about the central axis 20.

End windings of the stator coils 120 (e.g., crown end windings and/or weld end windings) of the stator 110 can be of a conductive material such as copper or another suitable metal or material. The end windings of the stator coils 120 may protrude axially beyond the rotor 150 and/or concentrically surround the rotor 150. The end windings of the stator coils 120 are connected to each other in parallel and/or in series to form a set of winding with multiple-phase terminals, which are operably connected to a controller, such as a processing unit of an electronic system, described further herein.

The rotor shaft 12 and/or the rotor 150 can be rotated with a first bearing assembly 25 disposed at the first end of the rotor shaft 12 and a second bearing assembly 27 disposed at the second end of the rotor shaft 12. As such, the rotor 150 and/or the rotor shaft 12 can be rotated about the central axis 20 as it responds to the rotating magnetic field generated by the stator 110. The rotor shaft 12 can accordingly provide torque output. Such output can be detected, for example by a sensor of an electronic system, described further herein.

The rotor coils 170 can form winding segments 172 of its windings that extend within the rotor 150. For example, as shown in FIG. 1, the rotor coils 170 can form winding segments 172 that each extend in a direction that is generally parallel to the central axis 20 of the rotor 150. Additionally or alternatively, winding segments 172 can extend longitudinally in a direction that is generally parallel to the segments of the stator coils 120. Each winding segments 172 can extend to or toward one or both of longitudinally terminal ends of the rotor 150. For example, a given winding segment 172 can extend longitudinally within a body of the rotor 150 and connect to another winding segment 172 on a circumferentially adjacent pole of the rotor 150. As such, the winding segments 172 can form windings that extend both parallel to the central axis 20 and across the central axis 20 to form one or more loops. One or more end windings 174 can be provided at one or more ends of the rotor 150. Each of the end windings 174 of the of the rotor coils 170 can be operably connected to a controller, such as a processing unit of an electronic system, described further herein. In some embodiments, the end windings 174 can be connected to a power source through one or more brushes (not shown), such that the rotor 150 and the rotor coils 170 can rotate while the power source and/or control circuitry provides power (e.g., electric current) without rotating. Such brushes can further provide a generally consistent current to the rotor coils 170, such that the resulting temporary magnetic field can be maintained as needed during rotation of the rotor 150. Accordingly, the end windings 174 can be connected (e.g., with brushes) in a manner that facilitates rotation and an direct current (DC) through the rotor coils 170.

Figure 2:
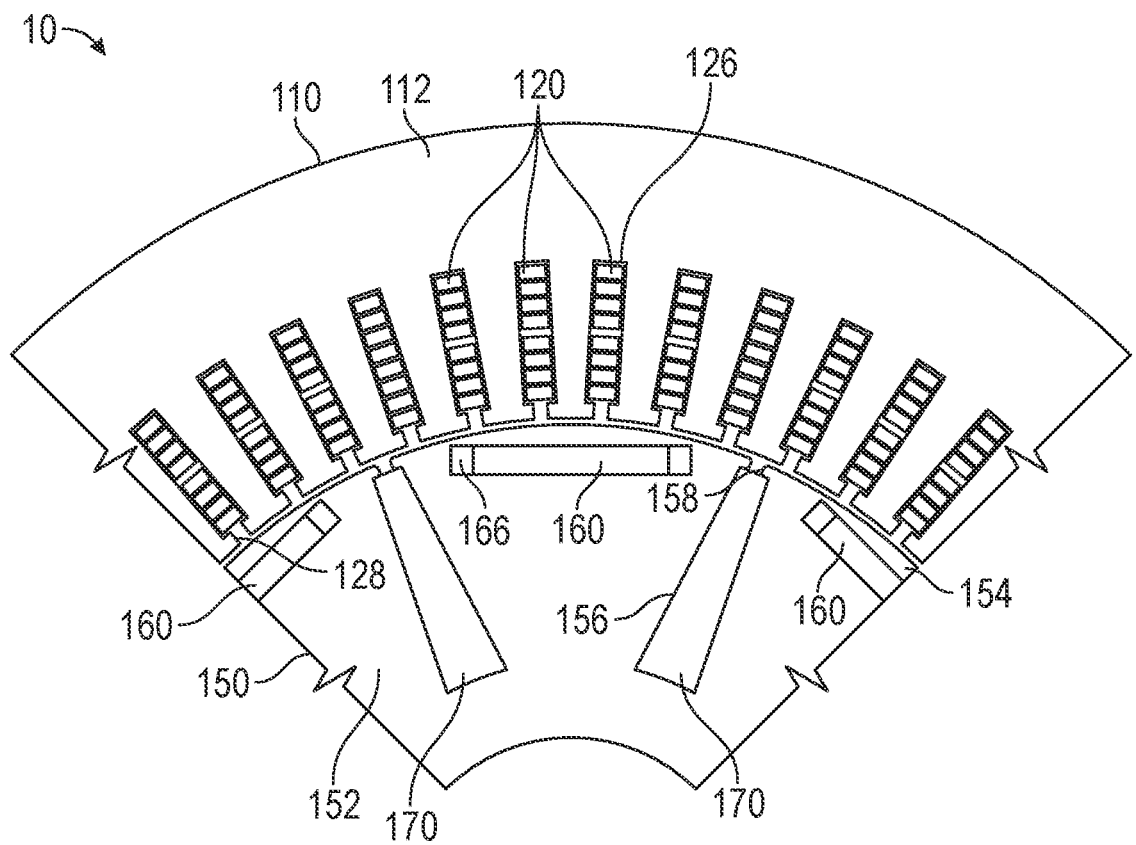
FIG. 2 illustrates a sectional view of a portion of the electric motor of FIG. 1 in accordance with one or more implementations of the subject technology.

Referring now to FIG. 2, a stator and a rotor can interact to provide rotational output. While FIG. 2 shows a portion of a motor 10, it will be understood that the portion shown can be a portion of a pattern that repeats circumferentially about a central axis to form continuous cylindrical structures. The pattern can repeat with any number of cycles, such that the illustrated example is not limited to the arrangement shown.

In some embodiments, as shown in FIG. 2, a stator 110 can include a stator body 112 and stator coils 120. The stator coils 120 and/or segments thereof can be positioned within stator coil chambers 126 formed within the stator body 112. The stator coil chambers 126 can form openings 128 at a radially inner side of the stator body 112 facing the rotor 150. The openings 128 can direct the magnetic fields generated by the stator coils 120 to be directed towards the rotor 150. The magnetic fields can be shaped, at least in part, by the geometry of the stator body 112.

In some embodiments, as further shown in FIG. 2, a rotor 150 can include a rotor body 152, permanent magnets 160, and rotor coils 170. In some embodiments, the permanent magnets 160 can be positioned within magnet chambers 166 formed within the rotor body 152. The rotor body 152 defines cover portions 154 each disposed radially between a corresponding one of the multiple magnet chambers 166 and a radially outermost side of the rotor 150. The cover portions 154 can retain the permanent magnets 160 in place as the rotor 150 rotates. The magnet chambers 166 can be distributed such that the permanent magnets 160 can be circumferentially spaced apart from each other and about the central axis.

In some embodiments, the rotor coils 170 and/or segments thereof can be positioned within rotor coil chambers 156 formed within the rotor body 152. The rotor coil chambers 156 can form openings 158 at a radially outer side of the rotor body 152 facing the stator 110. For example, the rotor body 152 can define the openings 158 such that each opening 158 is disposed radially between a corresponding one of the multiple coil chambers 156 and a radially outermost side of the rotor 150. The openings 158 can direct the magnetic fields generated by the rotor coils 170 to be directed towards the stator 110. The magnetic fields can be shaped, at least in part, by the geometry of the rotor body 152.

As described herein, the stator coils 120 can be operated to generate a rotating magnetic field. For example, the stator coils 120 can be operated with alternating current with different segments thereof having a different direction and/or magnitude of current at any given moment. As the current direction and/or magnitude changes for each segment of the stator coils 120 over time, the magnetic field generated in the vicinity thereof can correspondingly change. The rotating magnetic field can extend through the rotor 150 to magnetically couple to the fields generated by the permanent magnets 160 and/or the rotor coils 170. The rotating magnetic field generated by the stator 110 can magnetically interact with such components of the rotor 150 to cause the rotor 150 to rotate.

Figure 3:
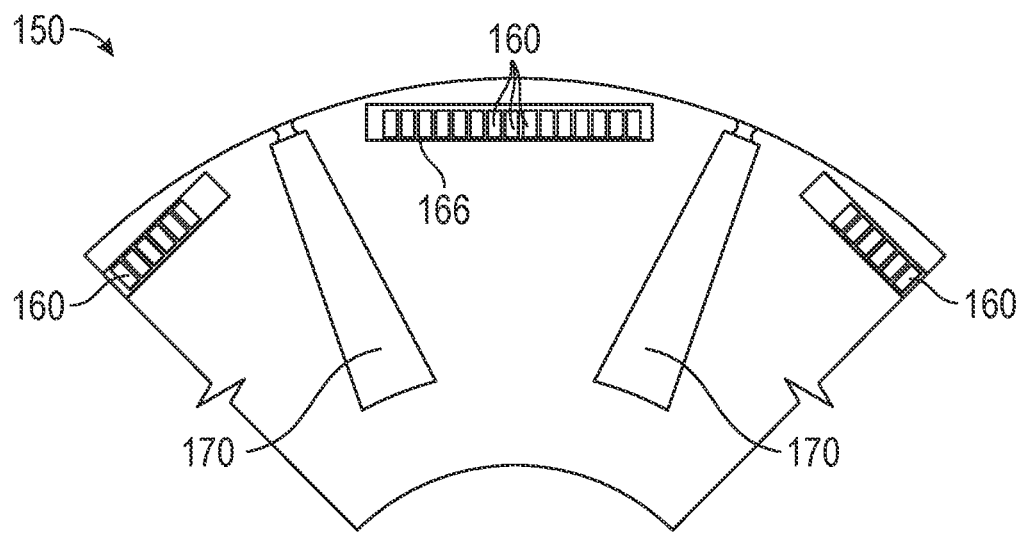
FIG. 3 illustrates a sectional view of a portion of a rotor in accordance with one or more implementations of the subject technology.

Referring now to FIG. 3, it will be understood that the permanent magnets 160 can be provided in any arrangement, position, orientation, and/or number. For example, the permanent magnets 160 may have varying sizes to fit within the magnet chambers 166 of the rotor 150 to reduce back electromagnetic forces. In some embodiments, as shown in FIG. 3, each magnet chamber 166 can include multiple permanent magnets 160. A group of the permanent magnets 160 within one of the multiple magnet chambers 166 can be circumferentially staggered with respect to each other within the corresponding magnet chamber 166. Additionally or alternatively, the permanent magnets 160 in a given magnet chamber 166 and/or different magnet chambers 166 can have different sizes, shapes, materials, magnetic properties, and the like. While one magnetic chamber 166 is shown circumferentially between a given pair of circumferentially adjacent rotor coils 170, any number of magnetic chambers 166 and/or permanent magnets can be provided between a pair of circumferentially adjacent rotor coils 170.

Figure 4:
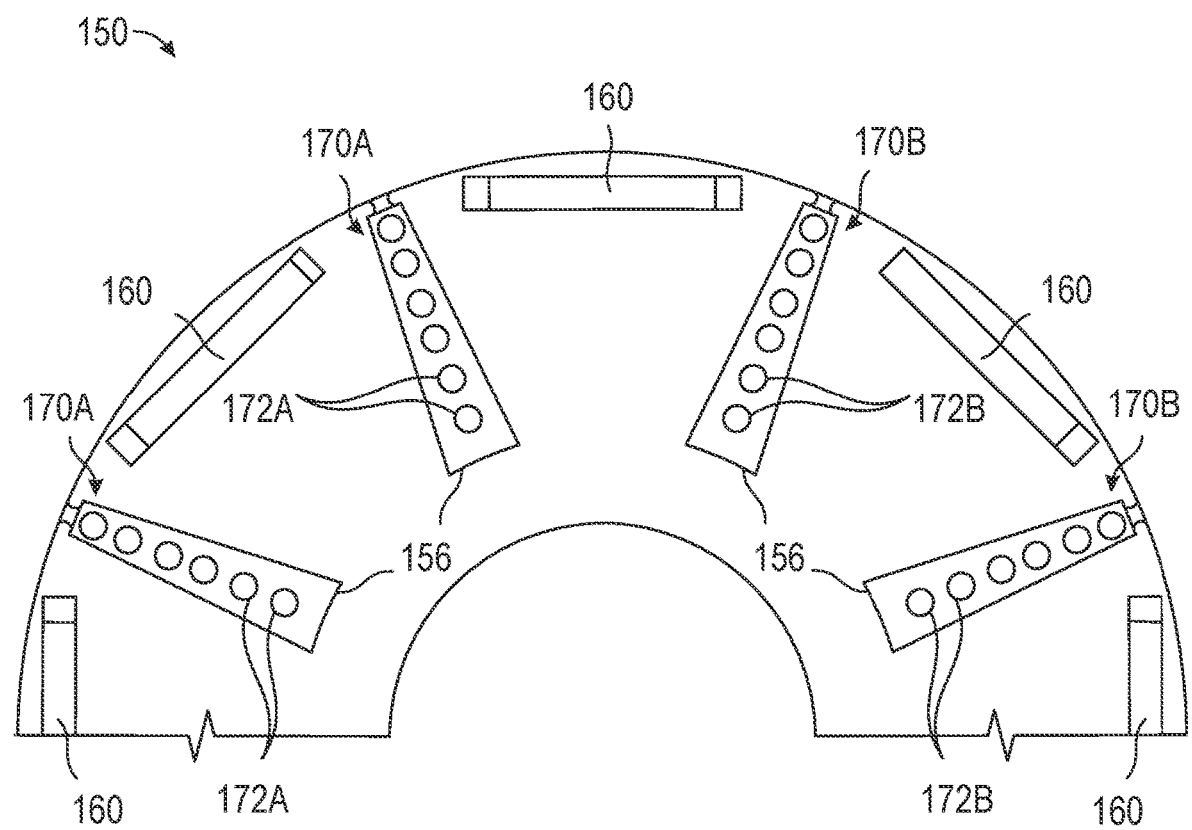
FIG. 4 illustrates a sectional view of a portion of a rotor in accordance with one or more implementations of the subject technology.

Referring now to FIG. 4, rotor coils 170 can be arranged to generate temporary magnetic fields. As shown in FIG. 4, rotor coils 170 can each include one or more winding segments 172 that are grouped together within a corresponding one of the coil chambers 156 defined by the rotor body 152. For example, the rotor coils 170A and 170B can each form multiple winding segments 172A and 172B, respectively, that are positioned circumferentially between a corresponding adjacent pair of the permanent magnets 160. By further example, winding segments 172A within a given coil chamber 156 can each connect to a corresponding one of the winding segments 172A within an adjacent coil chamber 156 to form loops with a number of turns (N), thereby forming a rotor coil 170A with N turns that extend across the adjacent pair of coil chambers 56. Such a rotor coil 170A can further extend around and/or near a corresponding one of the magnets 160. As shown in FIG. 4, first winding segments 172A of first rotor coil 170A can extend longitudinally within each of a corresponding pair of coil chambers 156 of the rotor 150 and connect to other first winding segments 172A of the same first rotor coil 170A in another coil chamber 156 on a circumferentially adjacent permanent magnet 160. One more of the winding segments 172A of one rotor coil 170A can optionally connect to another winding segment 172B of an adjacent rotor coil 170B. As such, each rotor coil 170A or 170B can be formed of constituent segments (e.g., 172A or 172B, respectively) that wind in loops, spirals, and/or helices to circumferentially opposite sides of the corresponding permanent magnet 160. Furthermore, the coil segments on different (e.g., circumferentially adjacent) sides of a given permanent magnet 160 can provide current in opposite directions, such as in opposite directions parallel to the central axis. Such flow can facilitate the generation of temporary magnetic fields that supplement the permanent magnetic fields generated by the permanent magnets 160.

In some embodiments, while each of the rotor coils 170 (e.g., first rotor coil 170A, second rotor coil 170B, etc.) of the rotor 150 can form one or more loops about a corresponding permanent magnet 160, individual rotor coils 170 can be electrically connected to provide current and generate magnetic fields as desired. For example, one or both terminal ends of a given rotor coil 170 (e.g., first rotor coil 170A, second rotor coil 170B, etc.) can be electrically connected to a terminal end of another rotor coil 170, such as a circumferentially adjacent rotor coil 170. Accordingly, separate rotor coils 170 can be connected in series to provide current (e.g., from a power source) there through. Accordingly, separate rotor coils 170 can be connected in parallel to provide current (e.g., from a power source) there through. It will be understood that the rotor coils 170 can be connected in series and/or in parallel.

A group of winding segments 172 within one of the multiple coil chambers 156 can be radially or otherwise staggered with respect to each other within the corresponding rotor coil chamber 156. Additionally or alternatively, the winding segments 172 in a given coil chamber 156 and/or different rotor coil chambers 156 can have different sizes, shapes, materials, and the like. While one coil chamber 156 is shown circumferentially between a given pair of circumferentially adjacent permanent magnets 160, any number of coil chambers 156 and/or rotor coils 170 can be provided between a pair of circumferentially adjacent permanent magnets 160. Additionally, any number of turns and/or winding segments 172 within a given coil chamber 156 can be provided.

Figure 5:
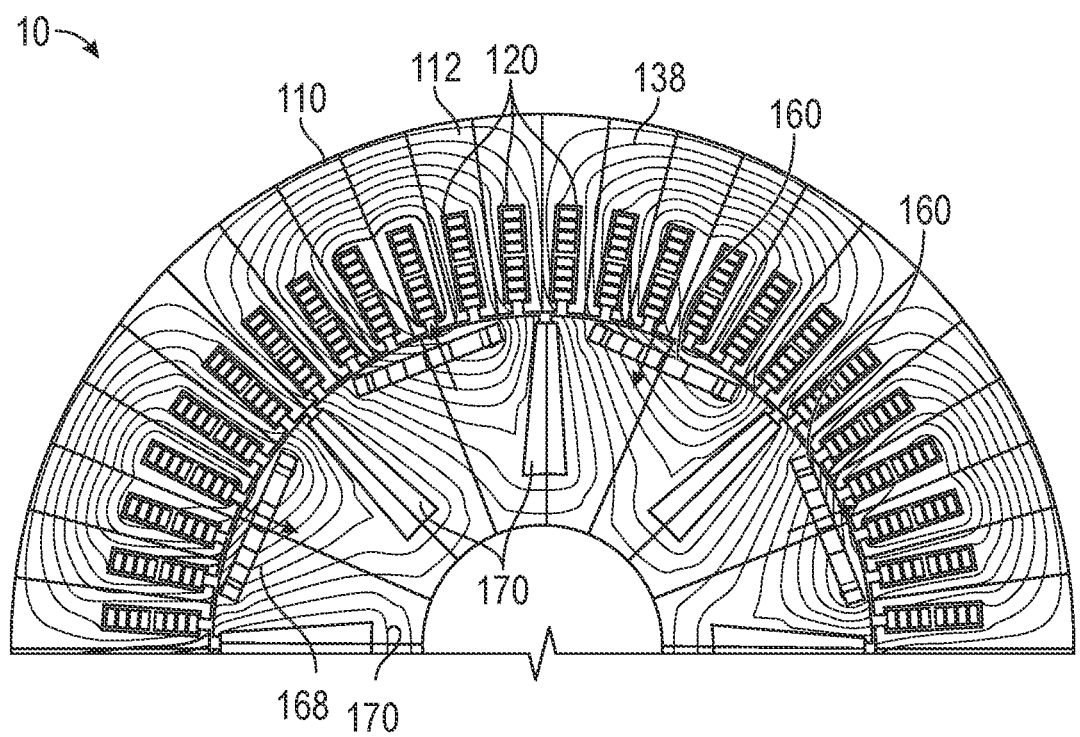
FIG. 5 illustrates a sectional view of a portion of a motor in accordance with one or more implementations of the subject technology.
Figure 6:
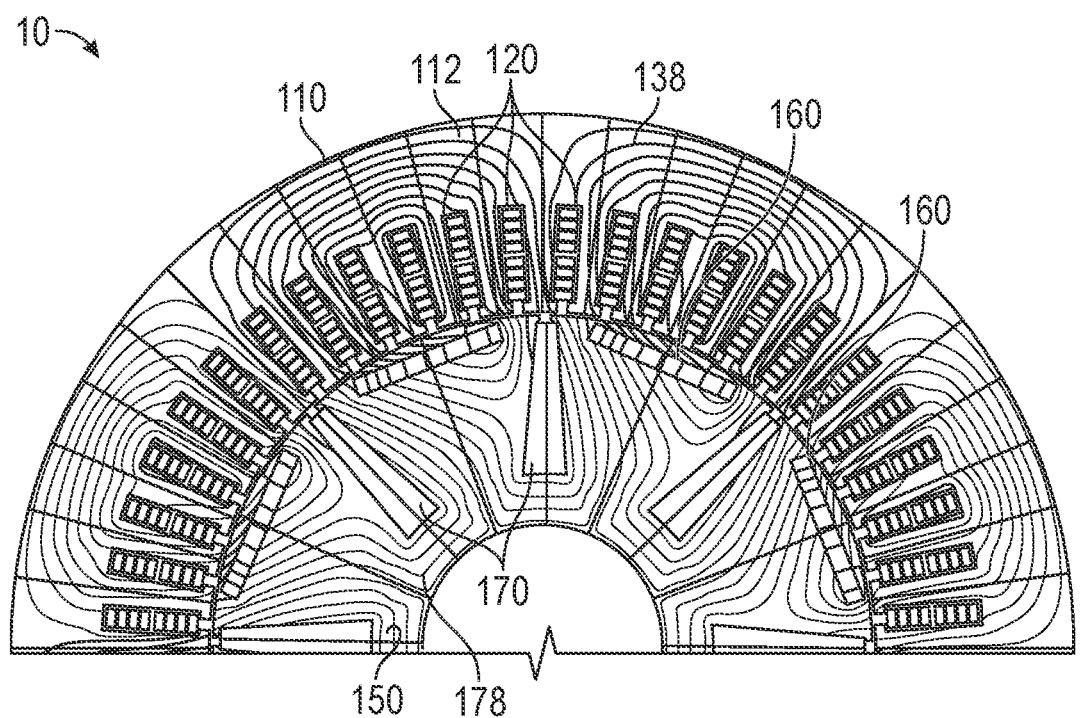
FIG. 6 illustrates a sectional view of the portion of the motor of FIG. 5 in accordance with one or more implementations of the subject technology.

Referring now to FIG. 5, permanent magnets of a rotor can provide magnetic fields for coupling to a rotating magnetic field of a stator. As shown in FIG. 5, the stator coils 120 of the stator 110 can be operated to generate a rotating magnetic field 138. For example, the stator coils 120 can be operated with variable current with different segments thereof having a different direction and/or magnitude of current at any given moment. As the current direction and/or magnitude changes for each segment of the stator coils 120 over time, the magnetic field 138 generated in the vicinity thereof can correspondingly change. The rotating magnetic field 138 can extend through the rotor 150 to magnetically couple to the magnetic field generated by the permanent magnets 160 (FIG. 5) and/or the rotor coils 170 (FIG. 6). The rotating magnetic field 138 generated by the stator 110 can magnetically interact with such components of the rotor 150 to cause the rotor 150 to rotate.

As further shown in FIG. 5, the permanent magnets 160 can be distributed with different circumferential positions with respect to each other. The permanent magnets 160 can have different magnetic orientations. For example, circumferentially adjacent ones of the permanent magnets 160 can have different (e.g., opposing) magnetic orientations with respect to the central axis. By further example, some permanent magnets 160 can have a north-south magnetic orientation such that permanent magnetic fields 168 extending there through are directed towards the central axis, and some permanent magnets 160 can have a north-south magnetic orientation such that permanent magnetic fields 168 there through are directed away from the central axis. It will be understood that every magnetic field can form closed loops, such that some portions of the magnetic field can be oriented in any given direction. However, references herein to the orientation of a permanent magnet refer to the magnetic orientation within and immediately adjacent to the corresponding permanent magnet.

Referring now to FIG. 6, rotor coils can be arranged such that, when operated, they generate temporary magnetic fields that supplement the permanent magnetic fields from the permanent magnets. As shown in FIG. 6, rotor coils 170 can form winding segments, wherein each group of winding segments or other portions of a given rotor coil 170 can be circumferentially between a corresponding adjacent pair of the permanent magnets 160. Such a rotor coil 170 can be operated to receive a current and generate a temporary magnetic field 178. As shown in FIG. 6, each temporary magnetic field 178 can have portions thereof that supplement each of different permanent magnetic fields 168 (shown in FIG. 5) of the corresponding adjacent pair of the permanent magnets 160. For example, each of the rotor coils 170 can be arranged and operated to receive a current and generate a temporary magnetic field 178 that extends through each of the corresponding adjacent pair of the permanent magnets 160. The portions of the temporary magnetic field 178 extending through each of the corresponding adjacent pair of the permanent magnets 160 can be aligned with corresponding permanent magnetic fields generated by the corresponding adjacent pair of the permanent magnets 160. As used herein, a magnetic field is aligned with another magnetic field if overlapping portions components of both magnetic fields each have a component that is parallel to the other. It will be understood that the entirety of such portions need not be parallel. Rather, the components can be in parallel such that representative field lines would form an angle that is less than 90 degrees at a point of intersection. As used herein, a magnetic field is supplementing another magnetic field if, when combined, the resulting combined magnetic field is stronger than either magnetic field alone. For example as shown in FIG. 6, the density and number of magnetic field lines representing the temporary magnetic field 178 (including its combination with the permanent magnetic fields 168 shown in FIG. 5) is greater throughout the rotor 150 than the density and number of magnetic field lines representing the permanent magnetic fields 168 shown in FIG. 5. Such an arrangement can allow the permanent magnetic fields 168 and the temporary magnetic fields 178 to combine (e.g., constructively interfere) in a manner that generates a combined magnetic field that is stronger than either one alone. This can also allow the permanent magnets 160 and the rotor coils 170 to more strongly magnetically couple to corresponding portions of the rotating magnetic field 138 generated by a stator 110 than would the permanent magnets 160 alone (i.e., without operation of the rotor coils 170).

Figure 7:
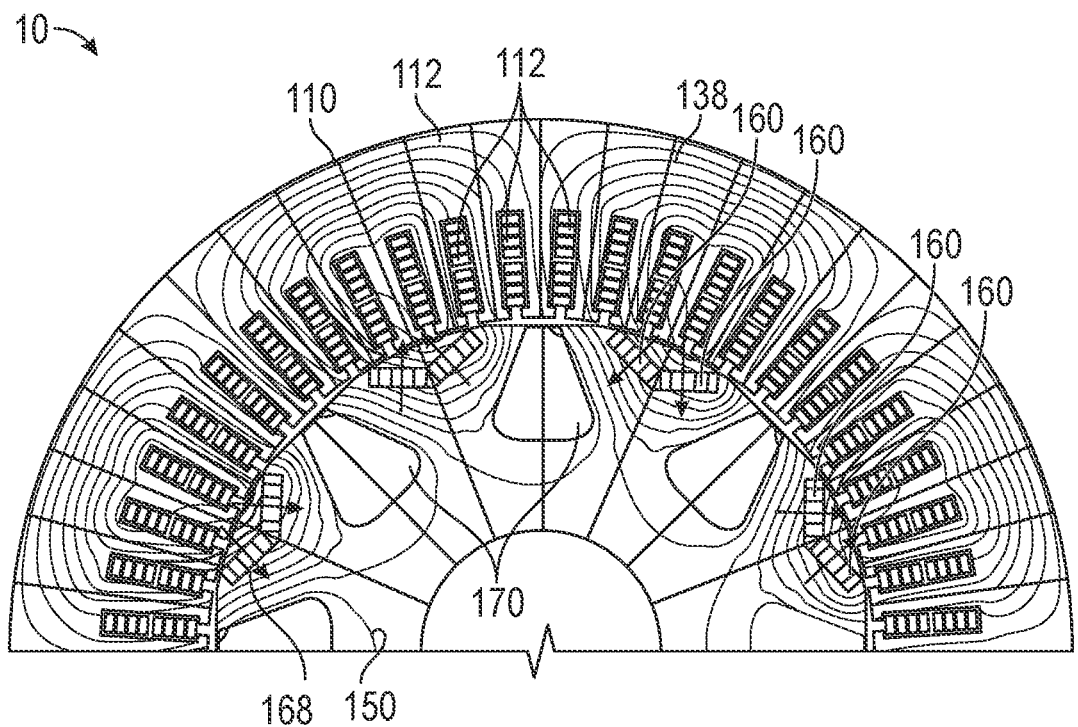
FIG. 7 illustrates a sectional view of a portion of a motor in accordance with one or more implementations of the subject technology.
Figure 8:
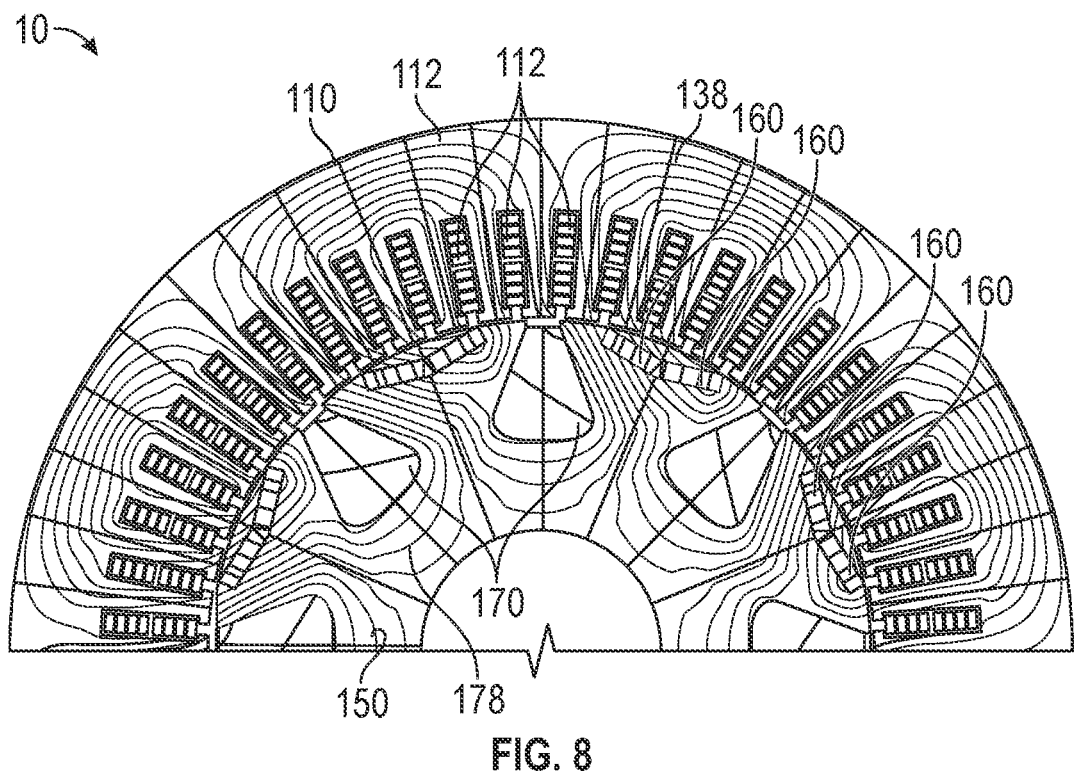
FIG. 8 illustrates a sectional view of the portion of the motor of FIG. 7 in accordance with one or more implementations of the subject technology.

Referring now to FIGS. 7 and 8, another arrangement of permanent magnets and rotor coils can provide either permanent and/or temporary magnetic fields for coupling to a rotating magnetic field of a stator. As shown in FIG. 7, multiple (e.g., 2 or more) permanent magnets 160 can be grouped together between a circumferentially adjacent pair of rotor coils 170. For example, each group of permanent magnets 160 can include constituent permanent magnets 160 that have different positions and/or orientations with respect to each other. As an example, adjacent permanent magnets 160 in FIG. 7 can be canted or otherwise be arranged to form an angle with respect to each other. The permanent magnets 160 within a group can optionally have symmetry across an axis, such as an axis that intersected the central axis of the rotor 150. The permanent magnets 160 within a group can have similar magnetic orientations to generate a combined permanent magnetic field 168. In some embodiments, circumferentially adjacent groups of permanent magnets 160 can have different (e.g., opposing) magnetic orientations with respect to the central axis. It will be understood that the permanent magnets 160 and groups thereof can be provided with any arrangement, position, and/or orientation to shape the resulting permanent magnetic field 168.

As shown in FIG. 8, rotor coils 170 can form winding segments, wherein each group of winding segments or other portions of a given rotor coil 170 can be circumferentially between a corresponding adjacent pair of groups of permanent magnets 160. Such a rotor coil 170 can be operated to receive a current and generate a temporary magnetic field 178, which can have portions thereof that supplement each of different permanent magnetic fields 168 (shown in FIG. 7) of the corresponding adjacent pair of groups of the permanent magnets 160. It will be understood that the rotor coils 170 and can be provided with any arrangement, position, and/or orientation to shape the resulting temporary magnetic field 178.

Figure 9:
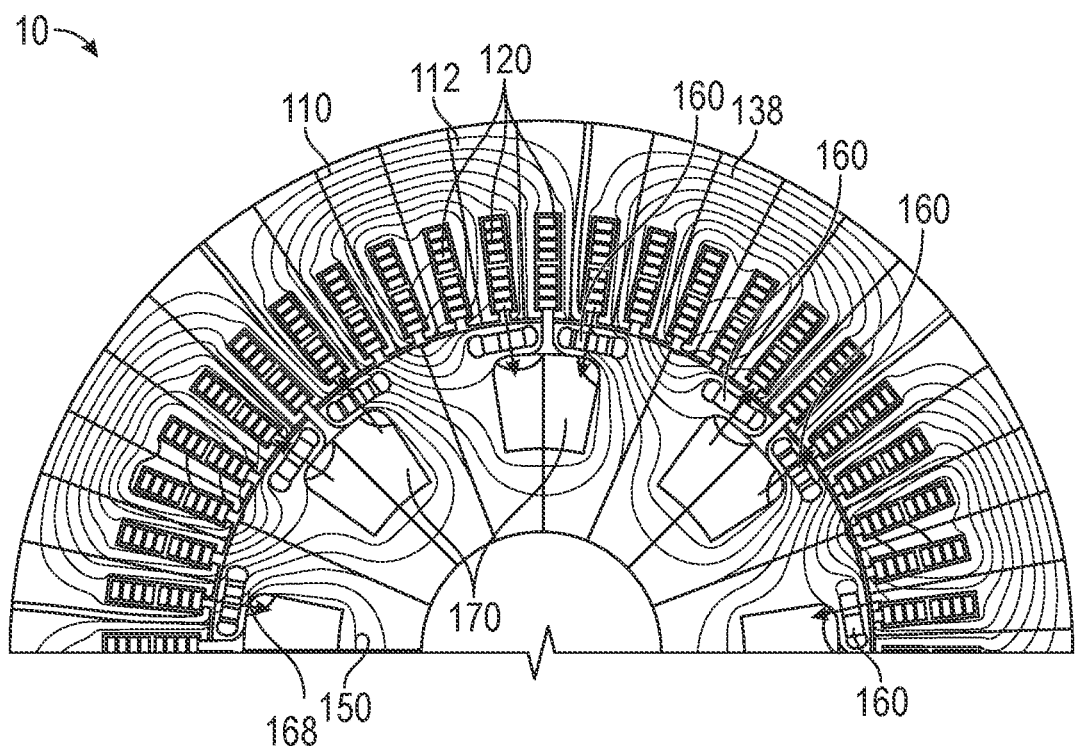
FIG. 9 illustrates a sectional view of a portion of a motor in accordance with one or more implementations of the subject technology.
Figure 10:
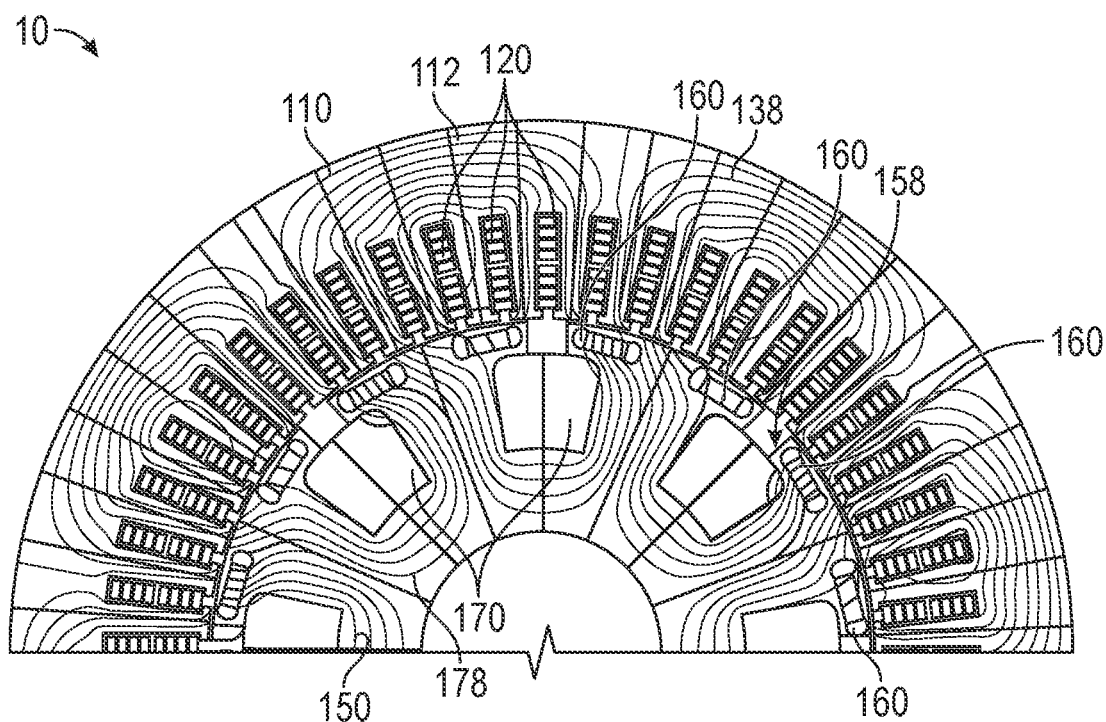
FIG. 10 illustrates a sectional view of the portion of the motor of FIG. 9 in accordance with one or more implementations of the subject technology.

Referring now to FIGS. 9 and 10, another arrangement of permanent magnets and coils can provide either permanent and/or temporary magnetic fields for coupling to a rotating magnetic field of a stator. As shown in FIG. 9, multiple (e.g., 2 or more) permanent magnets 160 can be grouped together near an adjacent rotor coil 170. For example, each group (e.g., pair) of permanent magnets 160 can include constituent permanent magnets 160 that are on opposing sides of an opening 158 in the rotor body 152 of the rotor 150. Such permanent magnets 160 can further be radially adjacent to (e.g., overlapping with) a corresponding coil 170. For example, rather than being between two circumferentially adjacent rotor coils 170, the permanent magnets 160 can be radially adjacent to a rotor coil 170. The permanent magnets 160 within a group (e.g., those adjacent to a given rotor coil 170) can have similar magnetic orientations to generate a combined permanent magnetic field 168. In some embodiments, circumferentially adjacent groups of permanent magnets 160 (e.g., each group being adjacent to a corresponding coil 170) can have different (e.g., opposing) magnetic orientations with respect to the central axis. It will be understood that the permanent magnets 160 and groups thereof can be provided with any arrangement, position, and/or orientation to shape the resulting permanent magnetic field 168.

As shown in FIG. 10, rotor coils 170 can form winding segments, wherein each group of winding segments or other portions of a given rotor coil 170 can be circumferentially adjacent to a corresponding group of permanent magnets 160. Such a rotor coil 170 can be operated to receive a current and generate a temporary magnetic field 178, which can have portions thereof that supplement each of different permanent magnetic fields 168 (shown in FIG. 9) of the corresponding groups of the permanent magnets 160. It will be understood that the rotor coils 170 can be provided with any arrangement, position, and/or orientation to shape the resulting temporary magnetic field 178.

Figure 11:
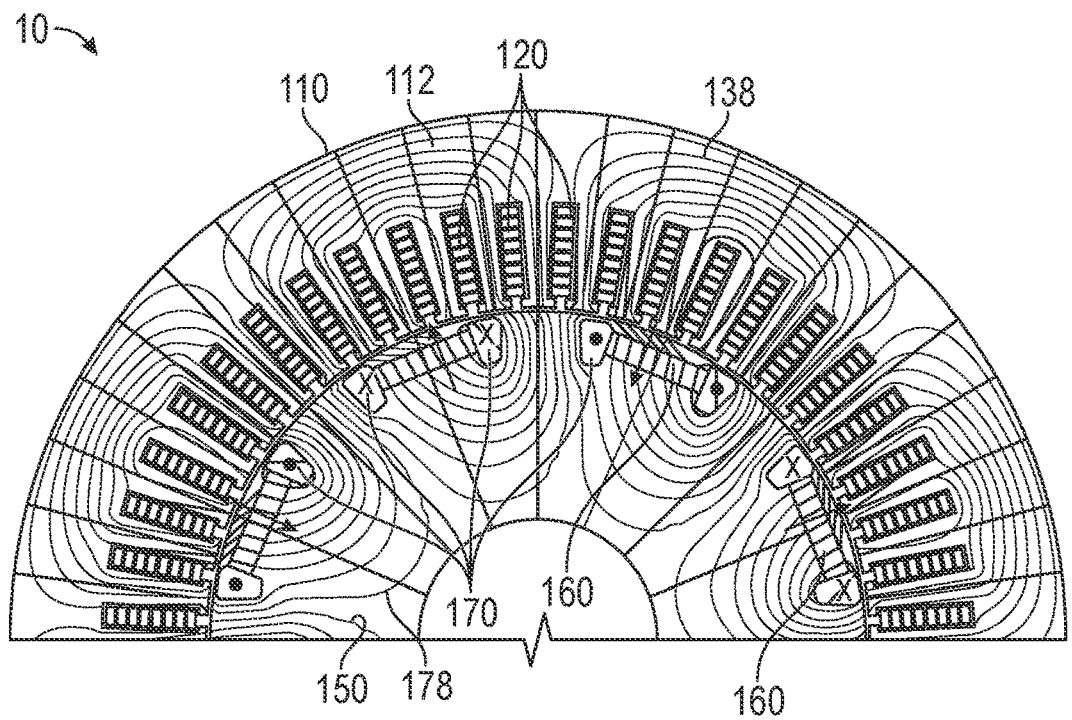
FIG. 11 illustrates a sectional view of a portion of a motor in accordance with one or more implementations of the subject technology.
Figure 12:
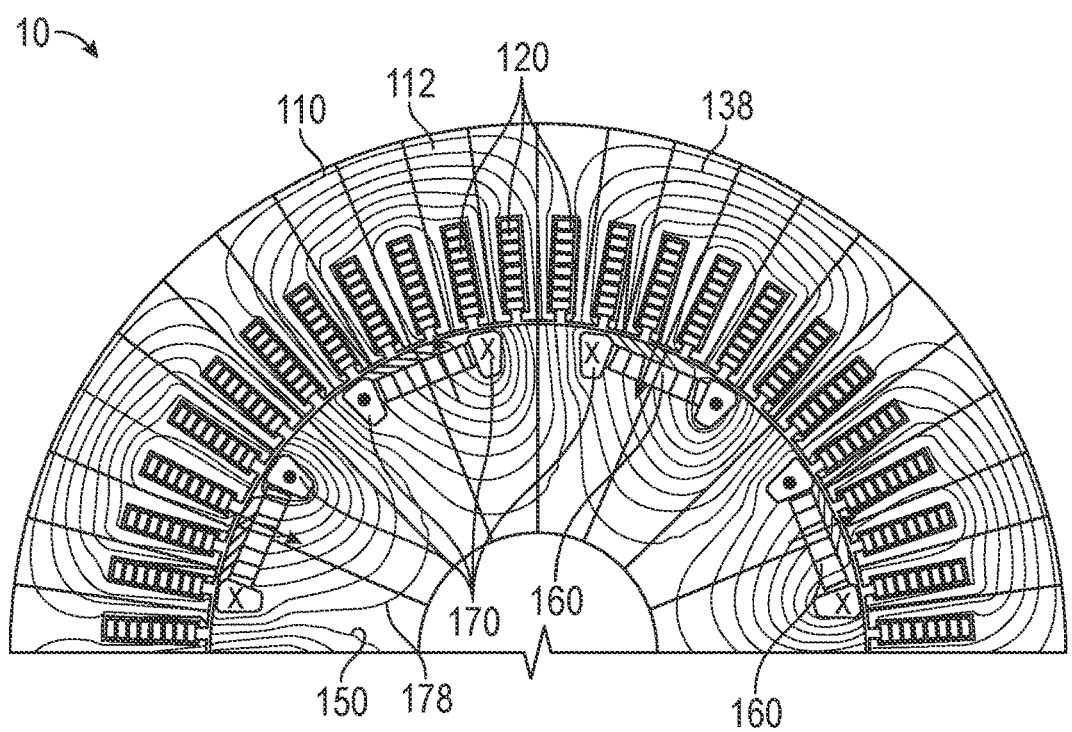
FIG. 12 illustrates a sectional view of the portion of the motor of FIG. 11 in accordance with one or more implementations of the subject technology.

Referring now to FIGS. 11 and 12, another arrangement of permanent magnets and coils can provide either permanent and/or temporary magnetic fields for coupling to a rotating magnetic field of a stator. As shown in FIGS. 11 and 12, the permanent magnets 160 can be distributed with different circumferential positions with respect to each other. While one arrangement is illustrated in FIGS. 11 and 12, it will be understood that any arrangement of permanent magnets 160, including those illustrated herein, can be provided. As further shown in FIGS. 11 and 12, rotor coils 170 can form winding segments, wherein each group of winding segments or other portions of a given rotor coil 170 can be circumferentially adjacent to a corresponding permanent magnet 160. Multiple (e.g., two or more) rotor coils 170 can be positioned on opposing (e.g., circumferential) sides of a given permanent magnet 160.

The rotor coils 170 can be operated in different modes to generate different magnetic fields. For example, any given pair of rotor coils 170 on opposing sides of a corresponding permanent magnet 160 can receive current in the same direction (FIG. 11) or different (e.g., opposite) directions (FIG. 12). By further example, any given pair of rotor coils 170 between a circumferentially adjacent pair of permanent magnets 160 can receive current in different (e.g., opposite) directions (FIG. 11) or the same direction (FIG. 12). By further example, the directions of current can be parallel to the central axis. It will be understood that such coils can be independently controlled to receive current in either direction as desired. Accordingly, the rotor coils 170 need not be connected to each other in series or parallel, but can be independently controlled as desired (e.g., by a power source). The rotor coils 170 can generate a temporary magnetic field 178, which can have portions thereof that supplement each of different permanent magnetic fields of the permanent magnets 160. It will be understood that the rotor coils 170 and can be provided with any arrangement, position, orientation, and/or operating mode to shape the resulting temporary magnetic field 178. For example, the different directions of current can shape the resulting temporary magnetic field 178 in different ways depending on the direction and/or magnitude of current through each rotor coil 170 and/or which rotor coils 170 are operated. As such, the rotor coils 170 can influence the permanent magnetic fields of the permanent magnets 160 in a variety of ways to generate the desired magnetic field.

Figure 13:
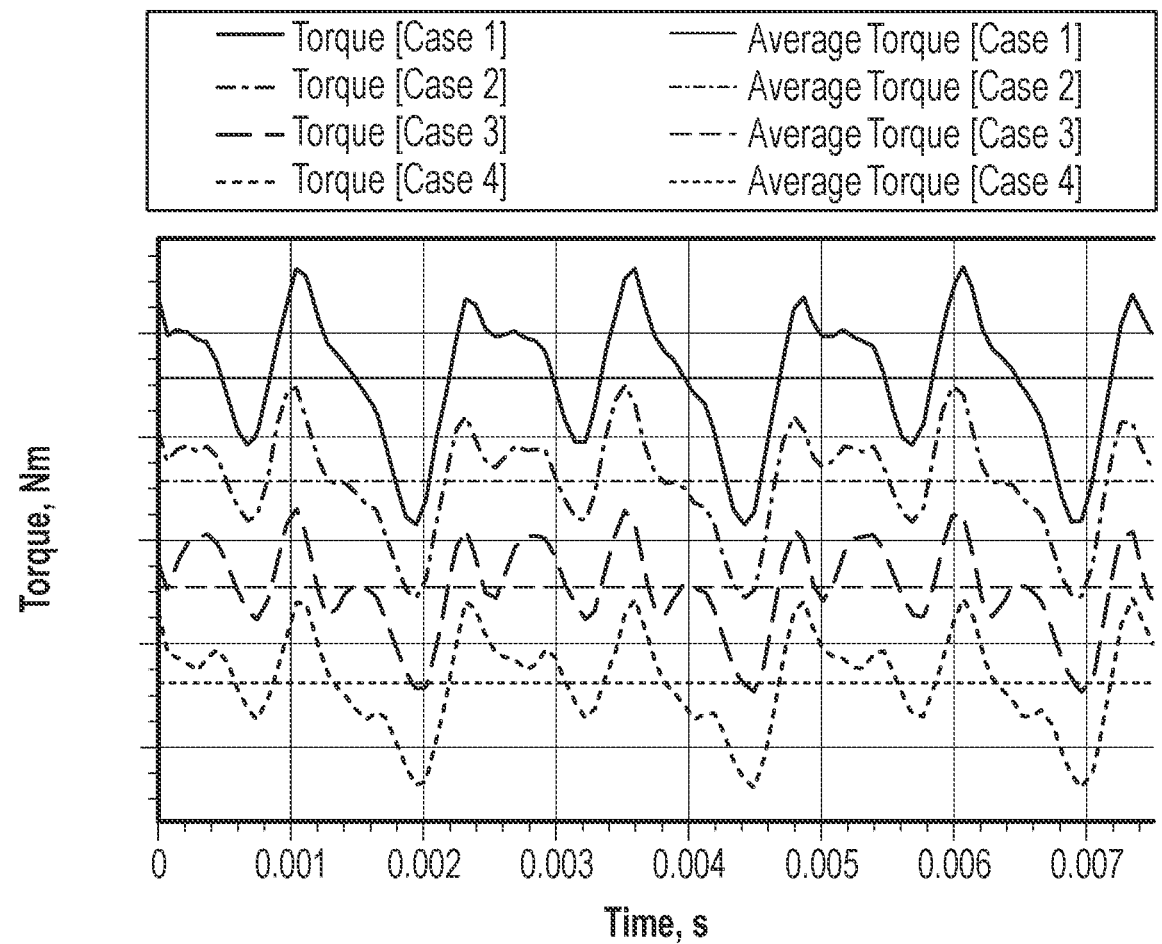
FIG. 13 illustrates a graph of motor torque output at various rotor winding activity levels in accordance with one or more implementations of the subject technology.

Referring now to FIG. 13, the torque output of a motor can be controlled based on operation of the rotor coils described herein. For example, the different cases (e.g., Case 1, Case 2, Case 3, and Case 4) correspond to different amounts of current provided to rotors coils of a rotor during generation of a rotating magnetic field from a stator. At lowest torque output (i.e., Case 4), no current is provided to the rotor coils. As such, only the permanent magnetic fields of the permanent magnets are used to magnetically couple the rotor to the rotating magnetic field from the stator. In other cases (i.e., Case 1 with 15A, Case 2 with 10A, and Case 3 with 5A), a non-zero amount of current is provided to the rotor coils. The current in Case 2 is higher than the current provided in Case 3, and the current in Case 1 is higher than the current provided in Case 2. Both the torque values over time and the average of such values are shown in the graph. It will be understood that the amounts of current disclosed herein are merely exemplary and that any amount of current can be provided, including values between or beyond those disclosed herein. As shown, with greater amounts of current, the torque correspondingly increases. The temporary magnetic fields generated by the rotor coils supplement the permanent magnetic fields from the permanent magnets. This increases the strength of the magnetic coupling with the rotating magnetic field. Accordingly, the torque can be increased to enhance the output even against resistance. Such torque output can be provided in response to a demand for torque (or increased torque), as described further herein. For example, the rotor coils can be operated to provide the torque output that is required to meet a demand for torque.

Figure 14:
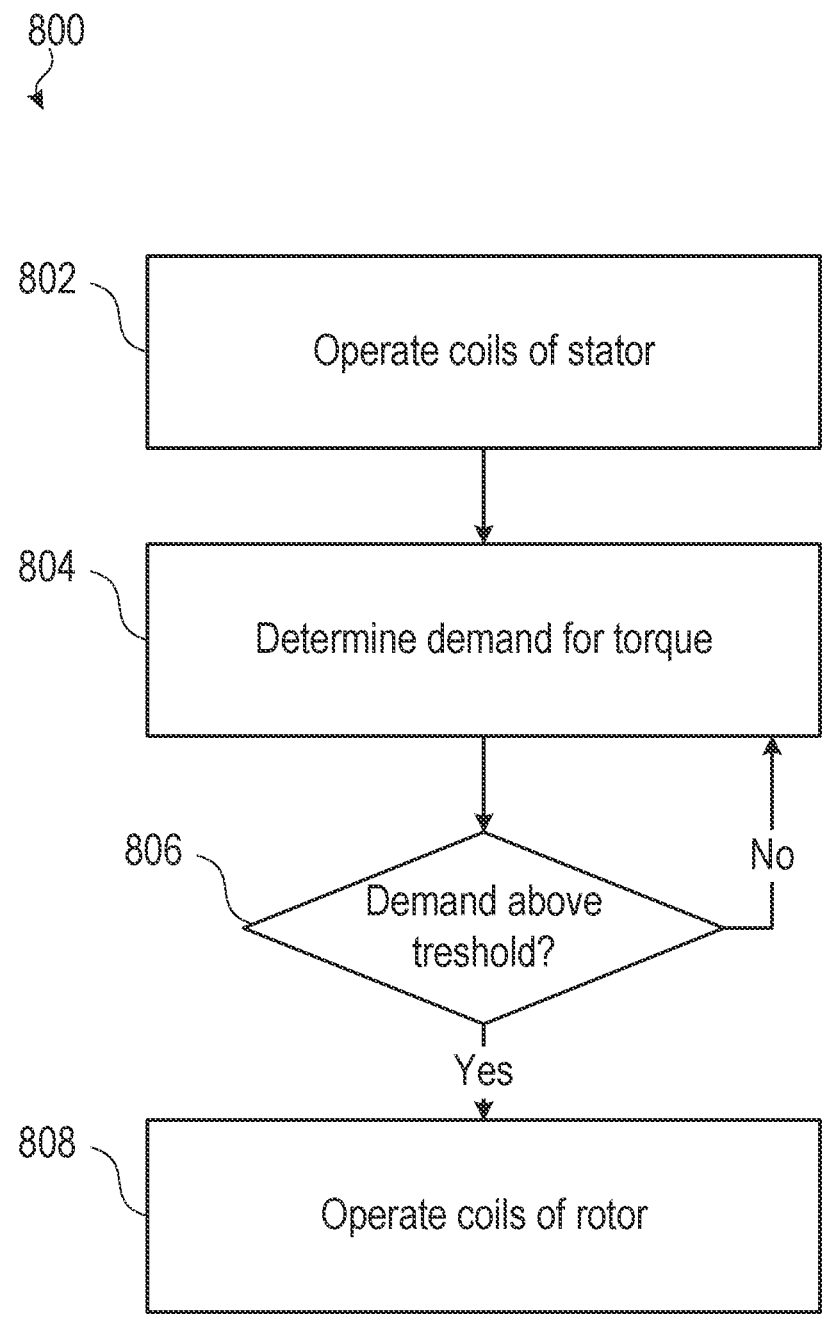
FIG. 14 illustrates a flow diagram of an example process for operating an electric motor in accordance with one or more implementations of the subject technology.

FIG. 14 illustrates a flow diagram of an example process 800 for operating an electric motor in accordance with one or more implementations of the subject technology. For explanatory purposes, the process 800 is primarily described herein with reference to the motor 10 of FIGS. 1 and 2, the rotor 150 of FIGS. 3-4, the motors of FIGS. 5-12, and/or various components thereof. However, the process 800 is not limited to the motor 10 of FIGS. 1 and 2 and/or the rotor 150 of FIGS. 3-4, the motors of FIGS. 5-12, and one or more blocks (or operations) of the process 800 may be performed by one or more other structural components of the motor 10 of FIGS. 1 and 2 and/or the rotor 150 of FIGS. 3-4, the motors of FIGS. 5-12, and/or of other suitable apparatuses, devices, or systems. Further, for explanatory purposes, some of the blocks of the process 800 are described herein as occurring in serial, or linearly. However, multiple blocks of the process 800 may occur in parallel. In addition, the blocks of the process 800 need not be performed in the order shown and/or one or more blocks of the process 800 need not be performed and/or can be replaced by other operations.

At block 802, an electric motor can be operated (e.g., by a processor) to generate a rotating magnetic field. The rotating magnetic field can be generated by running a current through each of multiple stator coils having segments of its windings distributed about a rotor of the motor. The rotating magnetic field generated by the stator can rotate about a central axis of the rotor. The rotating magnetic field can further extend through the rotor, which can include permanent magnets and rotor coils. The permanent magnets of the rotor generate permanent magnetic fields, which can respond to the rotating magnetic field by rotating the rotor, so that the permanent magnetic fields from the permanent magnets remain aligned with the corresponding portions of the rotating magnetic field. Accordingly, the permanent magnets of the rotor can be magnetically coupled to the rotating magnetic field from the stator.

At block 804, a demand for torque can be determined (e.g., by a processor). The demand for torque can be based on an input from a control unit, a user input, and the like. For example, a processor or other control unit can determine an amount of output (e.g., torque) to be provided by the shaft coupled to the rotor. By further example, a user can operate an input device, such as an accelerator, a pedal, and the like to determine a desired output of the motor and/or the shaft. In some embodiments, the demand for torque can be determined as the existence and/or amount of torque that is above that which can be provided based on the magnetic coupling between the rotating magnetic field and the permanent magnets. The demand for torque can be determined based on detected conditions (e.g., with a sensor) and/or predicted outputs (e.g., based on a predictive model).

At block 806, the demand for torque can be determined (e.g., by a processor) to be above or below a threshold. The threshold can be based on a present output of the motor (e.g., at the shaft) and/or a desired amount of torque. For example, the output (e.g., torque) of the motor can be determined and compared to a target output (e.g., torque) to determine whether the present output satisfies a demand for torque. If the demand for torque is determined to be below or at the threshold (i.e., not above the threshold), the process 800 can return to block 804 and/or another operation and/or process. If the demand for torque is determined to be above a threshold, the process 800 can proceed to block 808.

At block 808, the rotor coils of the rotor can be operated (e.g., by a processor) to generate temporary magnetic fields. The temporary magnetic fields can be generated in a manner to supplement the permanent magnetic fields of the permanent magnets. For example, when operating the rotor coils, each of the temporary magnetic fields can extend through each of a corresponding adjacent pair of the permanent magnets. Portions of each temporary magnetic field extending through each of the corresponding adjacent pair of the permanent magnets can be aligned with corresponding permanent magnetic fields generated by the corresponding adjacent pair of the permanent magnets.

Figure 15:
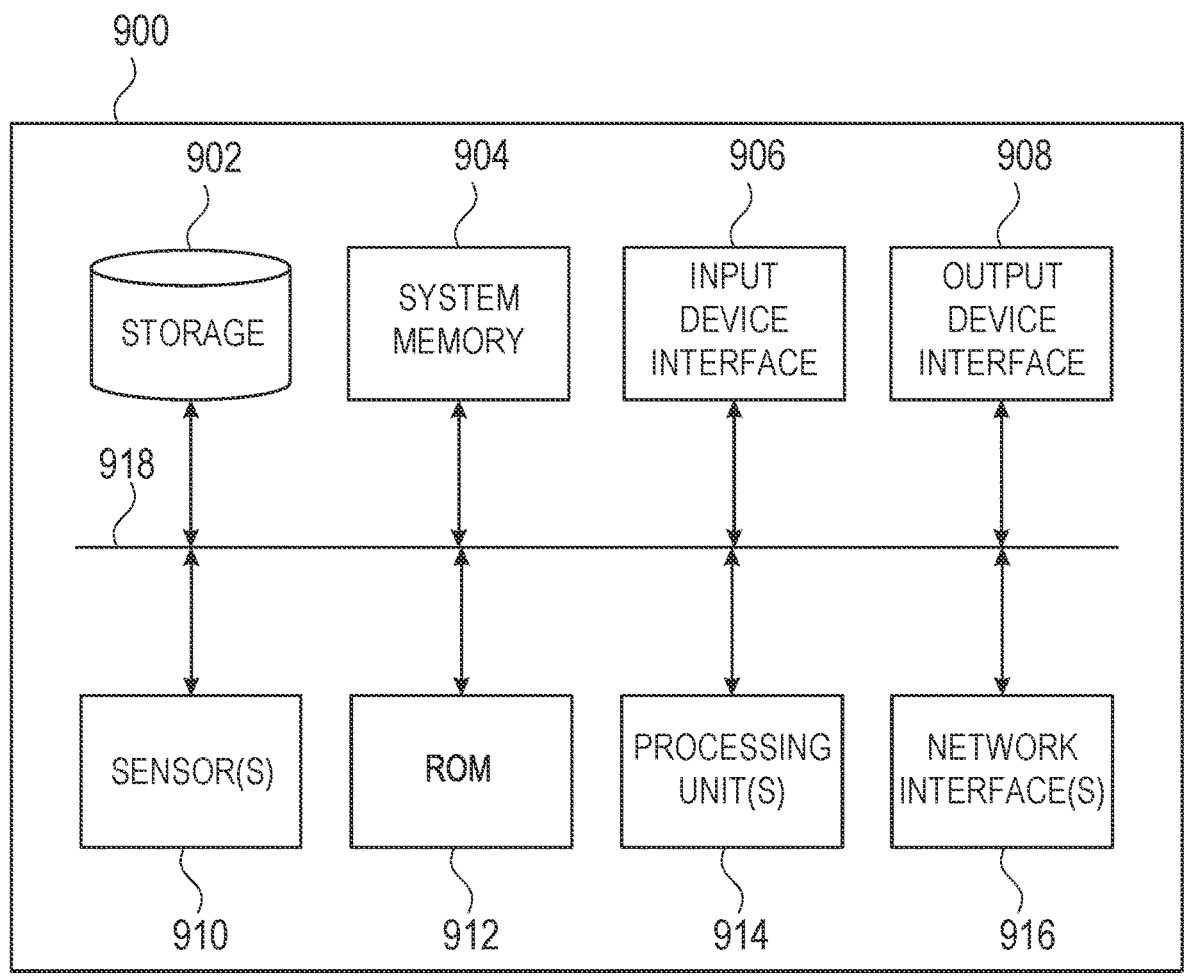
FIG. 15 illustrates an electronic system with which one or more implementations of the subject technology may be implemented.

FIG. 15 illustrates an example electronic system 900 with which aspects of the present disclosure may be implemented. The electronic system 900 can be, and/or can be a part of, any electronic device for providing the features and performing processes described in reference to FIGS. 1-4, including but not limited to a vehicle, computer, server, smartphone, and wearable device (e.g., authentication device). The electronic system 900 may include various types of computer-readable media and interfaces for various other types of computer-readable media. The electronic system 900 includes a persistent storage device 902, system memory 904 (and/or buffer), input device interface 906, output device interface 908, sensor(s) 910, ROM 912, processing unit(s) 914, network interface 916, bus 918, and/or subsets and variations thereof.

The bus 918 collectively represents all system, peripheral, and chipset buses that communicatively connect the numerous internal devices and/or components of the electronic system 900, such as any of the motor 10 of FIGS. 1 and 2, the rotor 150 of FIGS. 3-4, the motors of FIGS. 5-12, and/or various components thereof. In one or more implementations, the bus 918 communicatively connects the one or more processing unit(s) 914 with the ROM 912, the system memory 904, and the persistent storage device 902. From these various memory units, the one or more processing unit(s) 914 retrieves instructions to execute and data to process in order to execute the processes of the subject disclosure. The one or more processing unit(s) 914 can be a single processor or a multi-core processor in different implementations. In one or more implementations, one or more of the processing unit(s) 914 may be included on an ECU 204, such as in the form of the processor 206.

The ROM 912 stores static data and instructions that are needed by the one or more processing unit(s) 914 and other modules of the electronic system 900. The persistent storage device 902, on the other hand, may be a read-and-write memory device. The persistent storage device 902 may be a non-volatile memory unit that stores instructions and data even when the electronic system 900 is off. In one or more implementations, a mass-storage device (such as a magnetic or optical disk and its corresponding disk drive) may be used as the persistent storage device 902.

In one or more implementations, a removable storage device (such as a floppy disk, flash drive, and its corresponding disk drive) may be used as the persistent storage device 902. Like the persistent storage device 902, the system memory 904 may be a read-and-write memory device. However, unlike the persistent storage device 902, the system memory 904 may be a volatile read-and-write memory, such as RAM. The system memory 904 may store any of the instructions and data that one or more processing unit(s) 914 may need at runtime. In one or more implementations, the processes of the subject disclosure are stored in the system memory 904, the persistent storage device 902, and/or the ROM 912. From these various memory units, the one or more processing unit(s) 914 retrieves instructions to execute and data to process in order to execute the processes of one or more implementations.

The persistent storage device 902 and/or the system memory 904 may include one or more machine learning models. Machine learning models, such as those described herein, are often used to form predictions, solve problems, recognize objects in image data, and the like. For example, machine learning models described herein may be used to predict whether an authorized user is approaching a vehicle and intends to open a charging port closure. Various implementations of the machine learning model are possible. For example, the machine learning model may be a deep learning network, a transformer-based model (or other attention-based models), a multi-layer perceptron or other feed-forward networks, neural networks, and the like. In various examples, machine learning models may be more adaptable as machine learning models may be improved over time by re-training the models as additional data becomes available.

The bus 918 also connects to the input device interfaces 906 and output device interfaces 908. The input device interface 906 enables a user to communicate information and select commands to the electronic system 900. Input devices that may be used with the input device interface 906 may include, for example, alphanumeric keyboards, touch screens, and pointing devices. The output device interface 908 may enable the electronic system 900 to communicate information to users. For example, the output device interface 908 may provide the display of images generated by electronic system 900. Output devices that may be used with the output device interface 908 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information.

One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

The bus 918 also connects to sensor(s) 910. The sensor(s) 910 may include a location sensor, which may be used in determining device position based on positioning technology. For example, the location sensor may provide for one or more of GNSS positioning, wireless access point positioning, cellular phone signal positioning, Bluetooth signal positioning, image recognition positioning, and/or an inertial navigation system (e.g., via motion sensors such as an accelerometer and/or gyroscope). In one or more implementations, the sensor(s) 910 may be utilized to detect movement, travel, and orientation of the electronic system 900. For example, the sensor(s) may include a torque sensor, a resolver, an accelerometer, a rate gyroscope, and/or other motion-based sensor(s). The sensor(s) 910 may include one or more biometric sensors and/or image sensors for authenticating a user.

The bus 918 also couples the electronic system 900 to one or more networks and/or to one or more network nodes through the one or more network interface(s) 916. In this manner, the electronic system 900 can be a part of a network of computers (such as a local area network or a wide area network). Any or all components of the electronic system 900 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM. CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term includes, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different orders. Some of the steps, operations, or processes may be performed simultaneously. The accompanying method claims, if any, present elements of the various steps, operations, or processes in a sample order, and are not meant to be limited to the specific order or hierarchy presented. These may be performed in serial, linearly, in parallel, or in different order. It should be understood that the described instructions, operations, and systems can generally be integrated together in a single software/hardware product or packaged into multiple software/hardware products.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

Those of skill in the art would appreciate that the various illustrative blocks, modules, elements, components, methods, and algorithms described herein may be implemented as hardware, electronic hardware, computer software, or combinations thereof. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

The title, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A rotor for an electric motor, the rotor comprising:
a body configured to rotate about a central axis, wherein the body defines multiple coil chambers and openings to the multiple coil chambers, each of the openings being disposed radially between a corresponding one of the multiple coil chambers and a radially outermost side of the rotor;
permanent magnets within the body and circumferentially spaced apart from each other about the central axis, wherein the permanent magnets are arranged with a corresponding pair of the permanent magnets on opposing sides of each of the openings, wherein a pair of the permanent magnets on opposing sides of a corresponding one of the openings have a same magnetic polarity with respect to the central axis; and
rotor coils within the body, wherein each of the rotor coils forms winding segments that are positioned circumferentially between a corresponding adjacent pair of the permanent magnets, wherein each of the rotor coils is configured to receive a current and generate a temporary magnetic field that extends through each of the corresponding adjacent pair of the permanent magnets, wherein portions of the temporary magnetic field extending through each of the corresponding adjacent pair of the permanent magnets is aligned with corresponding permanent magnetic fields generated by the corresponding adjacent pair of the permanent magnets.

2. The rotor of claim 1, wherein circumferentially adjacent ones of the permanent magnets have different magnetic orientations with respect to the central axis.

3. The rotor of claim 1, wherein the body defines multiple magnet chambers, wherein each of the permanent magnets are arranged within a corresponding one of the multiple magnet chambers.

4. The rotor of claim 3, wherein the body defines cover portions each disposed radially between a corresponding one of the multiple magnet chambers and the radially outermost side of the rotor.

5. The rotor of claim 4, wherein the body further defines multiple coil chambers, wherein each of the rotor coils extends through a corresponding pair of the multiple coil chambers, the corresponding pair of the multiple coil chambers being on radially opposite sides of the central axis.

6. The rotor of claim 3, wherein a group of the permanent magnets within one of the multiple magnet chambers are circumferentially staggered with respect to each other.

7. The rotor of claim 1, wherein the winding segments extend longitudinally within the body between opposing ends of the rotor.

8. A motor comprising:
a stator comprising stator coils configured to generate a rotating magnetic field; and
a rotor configured to rotate about a central axis and comprising:
a body configured to rotate about the central axis, wherein the body defines multiple coil chambers and openings to the multiple coil chambers, each of the openings being disposed radially between a corresponding one of the multiple coil chambers and a radially outermost side of the rotor;
permanent magnets within the body and circumferentially spaced apart from each other about the central axis, wherein the permanent magnets are arranged with a corresponding pair of the permanent magnets on opposing sides of each of the openings, wherein a pair of the permanent magnets on opposing sides of a corresponding one of the openings have a same magnetic polarity with respect to the central axis; and rotor coils within the body and each forming winding segments, wherein each group of the winding segments that is circumferentially between a corresponding adjacent pair of the permanent magnets is configured to receive a current and generate a temporary magnetic field that supplements the different permanent magnetic fields of the corresponding adjacent pair of the permanent magnets.

9. The motor of claim 8, wherein the body defines multiple magnet chambers, wherein each of the permanent magnets are arranged within a corresponding one of the multiple magnet chambers.

10. The motor of claim 9, wherein the body defines cover portions each disposed radially between a corresponding one of the multiple magnet chambers and the radially outermost side of the rotor.

11. The motor of claim 10, wherein the body further defines multiple coil chambers, wherein each of the rotor coils extends through a corresponding pair of the multiple coil chambers.

12. The motor of claim 9, wherein a group of the permanent magnets within one of the multiple magnet chambers are circumferentially staggered with respect to each other.

13. The motor of claim 8, wherein segments of the stator coils extend longitudinally between opposing ends of the stator, and the winding segments of the rotor coils extend longitudinally between opposing ends of the rotor.

14. The motor of claim 8, wherein each of the rotor coils extends to radially opposite sides of the central axis.

15. A method comprising:
operating stator coils of a stator to generate a rotating magnetic field that extends through a rotor comprising permanent magnets and rotor coils, wherein the permanent magnets of the rotor generate permanent magnetic fields, the rotor further comprising a body configured to rotate about a central axis, wherein the body defines multiple coil chambers and openings to the multiple coil chambers, each of the openings being disposed radially between a corresponding one of multiple coil chambers and a radially outermost side of the rotor, wherein the permanent magnets are arranged with a corresponding pair of the permanent magnets on opposing sides of each of the openings, wherein a pair of the permanent magnets on opposing sides of a corresponding one of the openings have a same magnetic polarity with respect to the central axis;

determining a demand for torque; and if the demand for torque is above a threshold, operating the rotor coils of the rotor to generate temporary magnetic fields that supplement the permanent magnetic fields of the permanent magnets.

16. The method of claim 15, wherein, when operating the rotor coils, each of the temporary magnetic fields extends through each of a corresponding adjacent pair of the permanent magnets, wherein portions of each temporary magnetic field extending through each of the corresponding adjacent pair of the permanent magnets is aligned with corresponding permanent magnetic fields generated by the corresponding adjacent pair of the permanent magnets.

17. The method of claim 16, wherein circumferentially adjacent ones of the permanent magnets have different magnetic orientations with respect to the central axis of the rotor.

18. The method of claim 15, wherein, when operating the rotor coils with a current, a magnetic coupling between the rotor and the stator is stronger than when the rotor coils are not operated.

* * * * *